United States Patent Office 3,355,574
Patented Nov. 28, 1967

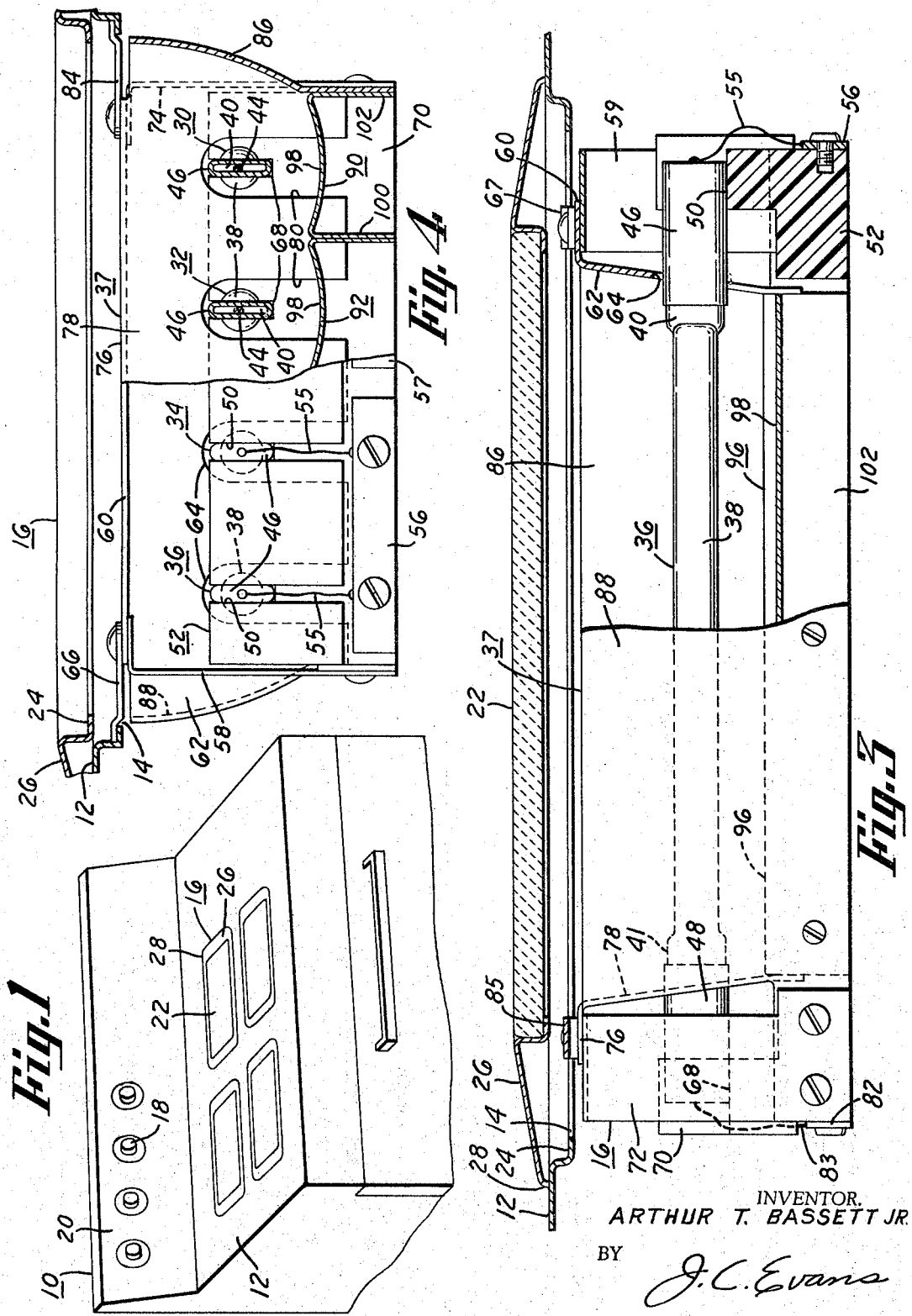

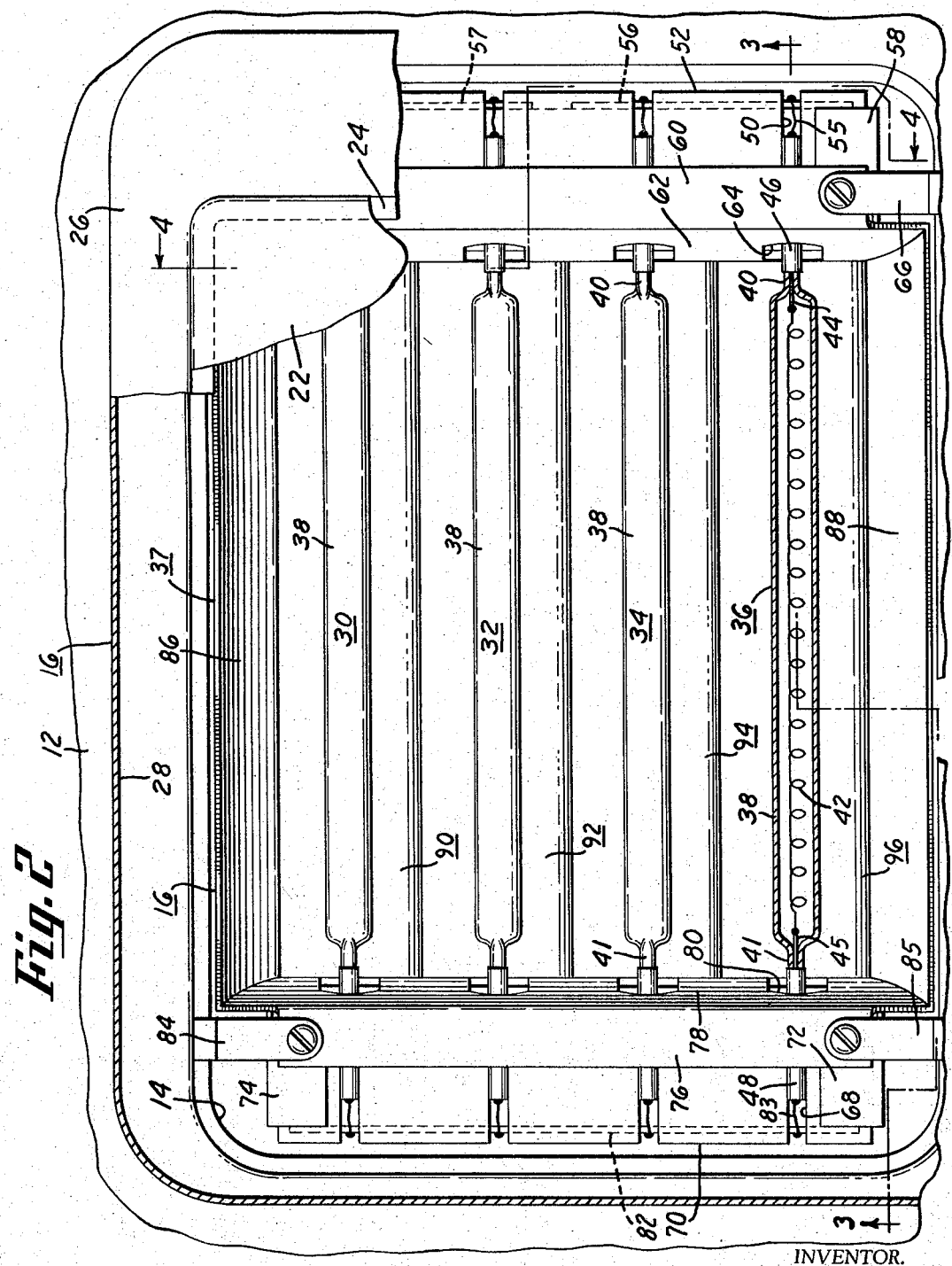

3,355,574
ELECTRICAL SURFACE HEATER WITH PLURAL LAMPS
Arthur T. Bassett, Jr., Dayton, Ohio, assignor to General Motors Corporation, Detroit, Mich., a corporation of Delaware
Filed Oct. 1, 1965, Ser. No. 492,059
3 Claims. (Cl. 219—464)

ABSTRACT OF THE DISCLOSURE

In preferred form an electrical surface heater including an infrared transmissive utensil supporting plate, a plurality of spaced apart elongated tubular lamps including an enclosed high temperature resistance element energizable into the infrared range and a plurality of elongated channel-shaped reflector members located on the sides and beneath said lamps for directing radiant energy therefrom uniformly through the support plate.

---

This invention relates to surface heating units and more particularly to surface heating units of the infrared type for association with domestic ranges or the like.

In conventional, presently marketed surface heating units, it has been the practice to utilize a tubular sheathed electrical resistance element wound in a spiral configuration as the heating element of the surface unit. Such units, while suitable for their intended purpose, rely primarily upon direct conductive heat transfer for heating utensils on the unit.

Furthermore, such units, because of the tubular sheathing about the electrical resistance element, often require a relatively substantial period to be heated sufficiently to raise the temperature of a utensil thereon. In certain instances this thermal lag is undesirable.

In order to obviate the problem of thermal lag and in order to improve heat transfer from a surface unit to a supported utensil, it has been proposed to use a surface heating unit of the type that heats primarily by infrared radiation. An example of such a unit is set forth in United States Patent No. 2,859,368, issued Nov. 4, 1958, to Biggs et al. Such units have a high temperature resistance element therein that is immediately responsive to being connected across a power source to be resistively self-heated into a temperature range to produce infrared energy emissions. Furthermore, since the heating effect of the unit is by radiant heat transfer, the unit is more effective in heating cooking utensils regardless of irregularities in the contact surface between the unit and a utensil supported thereon.

It is an object of the present invention to improve surface heater units of the type including a high temperature resistance element energizable into the infrared range by the provision of a plurality of infrared heater units each having an infrared transmissive envelope which surrounds a high temperature resistance element and wherein the plurality of heating units are disposed in a configuration with respect to an upper utensil supporting plate of infrared transmissive material for evenly directing radiant energy through the full planar extent thereof to heat a utensil supported by the plate.

Another object of the present invention is to improve infrared type surface heating units for association with electric ranges or the like by enclosing a high temperature, electrically energizable resistance element within an elongated infrared transmissive envelope having electrical terminals on opposite end portions thereof electrically connected to the resistance element and wherein the elongated heating unit is generally disposed in spaced parallelism with an infrared transmission upper utensil supporting plate and in radiation reflecting relationship with an infrared reflective surface that directs infrared radiation from the heating unit throughout substantially the full planar extent of the upper plate.

Still another object of the presetn invention is to improve infrared surface heating units for association with ranges or the like by the provision of an infrared heating lamp having an elongated form with an outer envelope of infrared transmission material and an enclosed high temperature electrical resistance element connected at opposite ends thereon to spaced apart electrical terminals on opposite ends of the envelope and wherein the lamp is disposed in spaced relationship with an upper utensil supporting plate of infrared transmissive material and wherein the lamp is associated with a reflective surface for directing a part of the radiation from the lamp as reflected energy through the upper plate, said reflective surface including heat transfer fins thereon for minimizing temperature increases in the reflective surface.

Still another object of the present invention is to provide a plural lamp, infrared surface heating unit for association with electrical ranges or the like wherein each of the lamps includes an elongated enclosure of infrared transmissive material and an interiorly located high temperature infrared emissive resistance connected at opposite ends thereon to spaced apart terminals on the enclosure and wherein the plurality of lamps are disposed to be coextensive with the planar extent of an upper utensil supporting plate of infrared transmissive material and wherein a plural, segment reflective surfaced member is disposed with respect to the lamps so that a curved surface on each of the segments reflects radiation energy from an aligned one of the lamps to be directed through the upper plate.

Further objects and advantages of the present invention will be apparent from the following description, reference being had to the acompanying drawings wherein a preferred embodiment of the present invention is clearly shown.

In the drawings:

FIGURE 1 is a view in perspective of a domestic range including the surface heating unit of the present invention;

FIGURE 2 is an enlarged top elevational view of one of the surface heating units with a utensil supporting plate portion thereof being partially broken away;

FIGURE 3 is a view in vertical section taken along the line 3—3 of FIGURE 2; and FIGURE 4 is a view in vertical section taken along the line 4—4 of FIGURE 2.

Referring now to the drawing, in FIGURE 1 a domestic electrical range 10 is shown including a top surface 12 thereon having a plurality of openings 14 therein. Within each of the openings 14 is located an infrared surface heating unit 16 constructed in accordance with certain of the principles of the present invention. The units 16 are selectively energized by a suitable, conventional selector control switch including a manually actuatable member 18 such as a rotatable knob, as shown on a representatively illustrated rearwardly located control panel 20 of the range 10.

The improved surface heater unit 16 is more specifically set forth in FIGURES 2 through 4 as including an upper utensil supporting plate 22 of high strength red transmissive material such as Pyrex, quartz or recrystallized glass ceramic material such as Cer-Vit, manufactured by Owens-Illinois, or a high silica glass such as Vycor, manufactured by Corning Glass. The plate 22 is representatively shown as having a rectangular configuration and is being supported on an inwardly turned flange 24 of a perimetric support ring 26 that has a downwardly depending edge 28 thereon in supported engagement with the top surface 12 of the range 10 around the opening 14 therein.

Below the infrared transmissive plate 22 is located a plural lamp source of radiant energy including four spaced apart infrared lamps heaters 30, 32, 34, 36 and a reflector plate 37 for the lamps 30 through 36. The lamps are disposed across the length and the width of the plate 22 for uniformly distributing infrared radiation therethrough against utensils supported thereon.

Each of the lamps 30 through 36 is characterized as being elongated in form and located in spaced relationship with the upper support plate 22 at a common level with respect thereto. Each of the lamps 30 through 36, as shown with reference to the lamp 36, includes an outer envelope 38 representatively shown as being tubular in form that is didrected across the length of the plate 22. The envelope is of a suitable infrared transmissive material such as quartz and has opposite ends 40, 41 thereon swaged together as best illustrated in FIGURE 3. Within the enclosure 38 is disposed a high temperature resistance element 42, for example, a spirally wound tungsten filament that has a lead wire 44, 45 connected on the opposite ends thereof which are directed through the swaged ends 40, 41, respectively, into electrical contact with an electrically conductive jacket 46 on end 40 of the unit and a like electrically conductive jacket 48 on the opposite end 41 of the unit. The ends 40, 41 of the heater unit 36 are sealed, for example by temperature fusing, and the interior of the envelope 38 is evacuated to protect the representatively shown tungsten filament 42.

The configuration of the illustrated infrared lamps 30 through 36 is such that the longitudinal axes therethrough are maintained substantially in a plane that is parallel to the plate 22. In the illustrated arrangement, each of the lamps 30 through 36 has the terminal forming jackets 46 thereon supported within openings 50 in an electrically insulated terminal block 52. Pigtails 55 electrically connect each of the jackets 46 to conductor plates 56, 57 on the block 52. The insulated terminal block 52 is located at one end of the unit 16 shown in the illustrated arrangement and has support arms 58, 59 on opposite sides thereof secured to an outwardly turned edge 60 of an end plate 62 of the reflector 37 which includes openings 64 therein through which the jackets 46 are passed for supported engagement with the block 52. Suitable means such as brackets 66, 67 secure the end plate 62 in-hung relationship on the upper surface 12 of the range around the opening 14 therein.

The terminal jackets 48 on the opposite ends of the lamps are located in openings 68 in a like electrically insulated terminal block 70 located at the opposite end of the unit 16. As was the case with terminal block 52, side support members 72, 74 are secured on the block 70 and are connected to an edge 76 of an end plate 78 of the unit 16 that includes openings 68 in the block 70. The positioned terminals 48 are electrically connected to a common conductor member 82 by pigtails 83. Suitable bracket means 84, 85 are connected to the end 78 of the unit 16 to secure it to the top surface 12 of the range.

In accordance with the certain principles of the present invention, the reflector 37 includes side portions 86, 88 that extend in spaced parallelism, respectively, with the outer lamps 30, 36, as best seen in FIGURES 2 and 4. The side members 86, 88 are concavely curved with respect to the lamps 30, 36 directing infrared radiations therefrom upwardly through a portion of the planar extent of the plate 22. Furthermore, the reflector 37 includes a plurality of elongated channel-shaped portions 90, 92, 94, 96 which are aligned with lamps 30, 32, 34, 36, respectively. Each of the channel-shaped segments of the reflector 37 includes a curved surface bight portion 98 concavely formed with respect to its respective aligned lamp and fin portions 100, 102 that are directed outwardly of the curved portion 98. The curved portion 98 that is aligned with each of the lamps serves to direct radiant energy therefrom by reflection upwardly through the upper transmissive support plate 22. The outwardly directed fins 100, 102 on the channel-shaped reflector portions 90 through 96 are cooled to dissipate any energy that is not reflected therefrom through the upper support plate to prevent undesirable temperature increases in the reflector 37.

While the lamps 30 through 36 and reflector portions 90 through 96 are shown as a straight line form, it will be appreciated that both the lamps and the reflector portions can be curved to varying degrees and still retain a lamp and reflector configuration that underlies substantially the complete planar extent of the upper plate 22.

By virtue of the illustrated arrangement, when the lamps 30 through 36 are connected across a suitable power source, they will rapidly heat to an elevated temperature at which the electrical resistance elements 42 therein will glow to produce a highly effective source of infrared energy which passes in part directly through the upper utensil supporting plate 22 and in part is passed downwardly to be reflected from the curved surfaces 98 of the reflector 37 upwardly through the plate 22. The radiation energy that passes from the sides of the lamps 30, 36 will likewise be reflected upwardly by the curved surfaces of the side members 86, 88.

In the illustrated arrangement the component parts of the reflector 37 that have the surfaces thereon exposed to the lamps 30 through 36 are polished to reflect infrared energy. If desired, the inside surfaces such as the curved surfaces on side members 86, 88 and the curved surfaces 98 can be coated with a layer of deposited gold or the like for reflecting the infrared radiation from the lamps 30 through 36.

By virtue of the cooling fins 100, 102, the reflector 37 has a reduced temperature increase due to absorbed radiation energy whereby a wide range of materials are suitable for use in the reflector 37. Furthermore, by virtue of the above-described configuration wherein individual elongated infrared lamps are used as the primary source of heat in a surface unit, the units 16 are almost immediately effective to raise the temperature of utensils on the plate 22 and since the utensil is being heated primarily through infrared heat transfer, the need for good surface contact between the heat source and the utensile is reduced as compared to surface heating units relying solely upon direct thermal contact for conductive heat transfer.

Still another feature of the above-described arrangement is that by the provision of a plurality of elongated separate infrared heating units having the longitudinal axis thereof disposed in a common plate in spaced parallelism with a utensil supporting plate of infrared transmissive material and wherein each of the infrared lamps is characterized by a 360° radiation therefrom, the plate 22 has a high percentage of the infrared radiation either passed thereto through direct radiation or reflective radiation in a manner wherein the density of the infrared radiation is distributed in a fairly uniform fashion across the plate 22 to avoid any extreme hot spots therein.

While the embodiment of the present invention as herein disclosed constitutes a preferred form, it is to be understood that other forms might be adopted.

What is claimed is as follows:

1. In a surface heating unit, the combination of, an infrared transmissive utensil supporting plate, a plurality of infrared heater units disposed in spaced relationship below said utensil supporting plate, each of said plurality of infrared heaters each including an elongated outer envelope having a high temperature electrical resistance element supported therein energizable into a temperature range for producing infrared radiation therefrom, each of said envelopes having an electrically conductive terminal connected on the opposite ends thereof, said resistance element being electrically connected to said terminals, said plurality of infrared surface heaters being located in spaced relationship with one another to underlie substantially the full planar extent of said utensil supporting plate, an infrared reflective surface located in spaced relationship to said infrared surface heaters for reflecting infrared radiation therefrom through said upper utensil supporting plate, said reflective surface including a plurality of elongated portions directed through substantially the full length of said infrared heaters, each of said portions being aligned with one of said infrared heaters for reflecting infrared radiation therefrom through said upper utensil supporting plate for uniformly distributing radiation therefrom throughout the planar extent of said utensil supporting plate, and fins on said elongated portions for cooling said infrared reflective surface.

2. In a surface heating unit, the combination of, an infrared transmissive utensil supporting plate, a plurality of infrared heater units disposed in spaced relationship below said utensil supporting plate, each of said plurality of infrared heater units including an elongated outer envelope having a high temperature electrical resistance element supported therein energizable into a temperature range for producing infrared radiation therefrom, each of said envelopes having an electrically conductive terminal connected on the opposite ends thereof, said resistance element being electrically connected to said terminals, said plurality of infrared heater units being located in spaced relationship with one another to underlie substantially the full planar extent of said utensil supporting plate, an infrared reflective surface located in spaced relationship to said infrared heater units for reflecting infrared radiation therefrom through said upper utensil supporting plate, said reflective surface including an outwardly bulged member on each side of said utensil supporting plate, said bulged members extending throughout the length of said infrared surface heater units in spaced relationship to said units, said reflective surface further including a base portion directed below and throughout the length of said infrared heater units having a plurality of curved segments therein, said curved segments serving to reflect radiation from said heater units along with said bulged members to uniformly distribute energy from said units through said supporting plate.

3. In a surface heating unit, the combination of, an infrared transmissive utensil supporting plate, a plurality of infrared heater units disposed in spaced relationship below said utensil supporting plate, each of said plurality of infrared heater units including an elongated outer envelope having a high temperature electrical resistance element supported therein energizable into a temperature range for producing infrared radiation therefrom, each of said envelopes having an electrically conductive terminal connected on the opposite ends thereof, said resistance element being electrically connected to said terminals, said plurality of infrared heater units being located in spaced relationship with one another to underlie substantially the full planar extent of said utensil supporting plate, an infrared reflective surface located in spaced relationship to said infrared heater units for reflecting infrared radiation therefrom through said upper utensil supporting plate, said reflective surface including a first side member in spaced relationship to one of said infrared heater units, a second side member in spaced relationship to another of said infrared heater units, each of said side members being curved outwardly of its adjacent infrared heater unit, said reflective surface further including a channel-shaped member directed in spaced relationship below and outwardly of each of said infrared heater units, each of said channel-shaped members having a curved bight portion formed concavely with respect to said units, said bight portions serving to reflect infrared radiation upwardly from said infrared heater units, and fins on each of said channel-shaped members serving to minimize temperature increases in said channel members.

References Cited
UNITED STATES PATENTS

| | | | |
|---|---|---|---|
| 2,870,316 | 1/1959 | Ferguson | 219—464 |
| 3,005,081 | 10/1961 | Kordes et al. | 219—352 |
| 3,155,814 | 11/1964 | Appleman et al. | 219—354 |
| 3,204,085 | 8/1965 | Busby | 219—352 |
| 3,240,915 | 3/1966 | Carter et al. | 219—354 |
| 3,246,121 | 4/1966 | Fannon et al. | 219—343 |
| 3,278,722 | 10/1966 | Fannon et al | 219—343 |

RICHARD M. WOOD, *Primary Examiner.*

L. H. BENDER, *Assistant Examiner.*